J. B. CHANDLER.
MOWING MACHINE.
APPLICATION FILED FEB. 9, 1915.
1,209,558.
Patented Dec. 19, 1916.
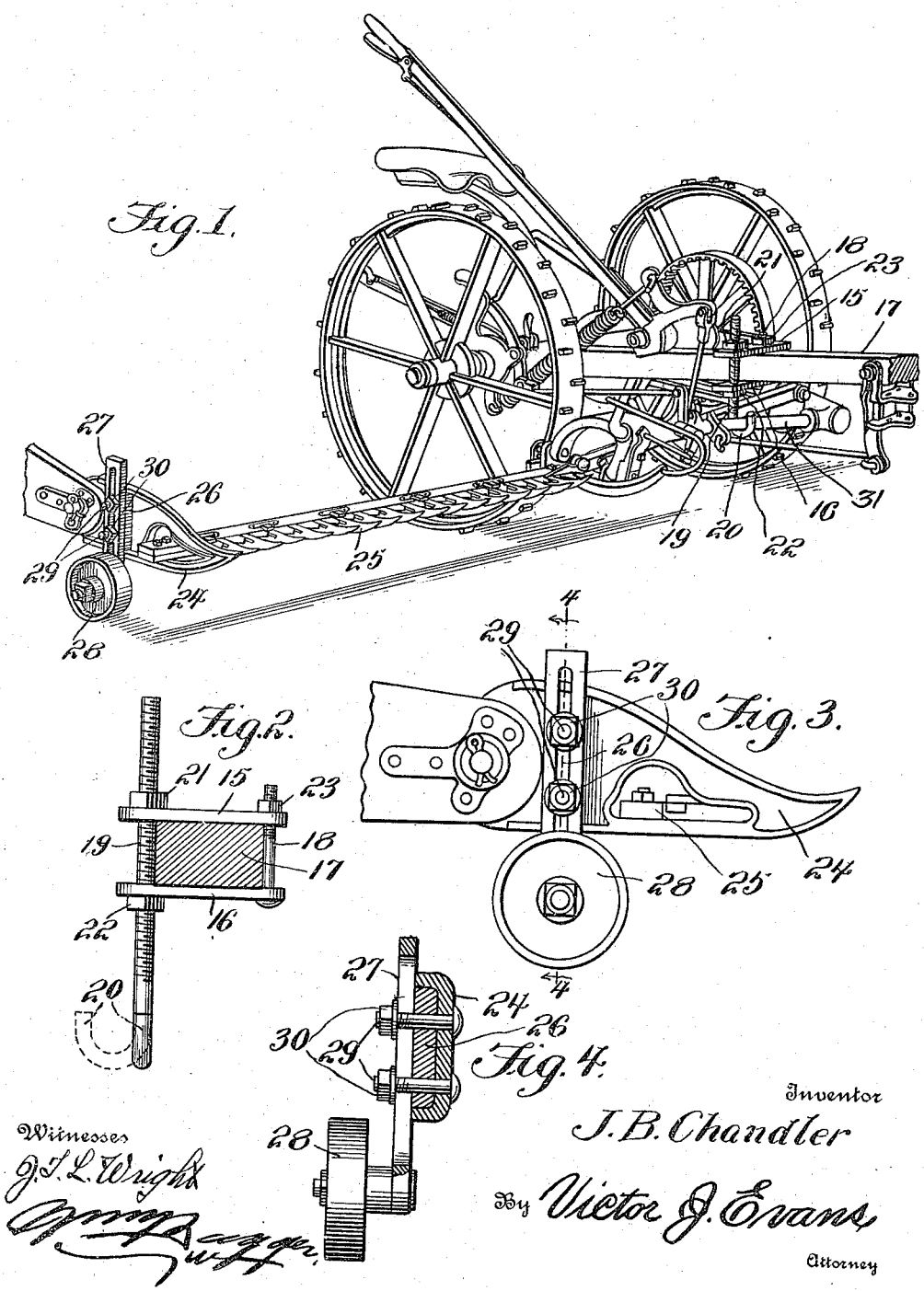
Inventor
J. B. Chandler
By Victor J. Evans
Attorney
Witnesses

UNITED STATES PATENT OFFICE.

JOHN B. CHANDLER, OF CAMPBELLSBURG, KENTUCKY.

MOWING-MACHINE.

1,209,558.

Specification of Letters Patent. Patented Dec. 19, 1916.

Application filed February 9, 1915. Serial No. 7,089.

*To all whom it may concern:*

Be it known that I, JOHN B. CHANDLER, a citizen of the United States, residing at Campbellsburg, in the county of Henry and State of Kentucky, have invented new and useful Improvements in Mowing-Machines, of which the following is a specification.

This invention relates to mowing machines, and it has for its object to furnish an attachment or appliance whereby the cutting apparatus may be sustained at various elevations above the ground, said attachment or appliance being independent of the lifting device commonly employed.

A further object of the invention is to produce a supporting device for the cutting apparatus of mowing machines which is capable of being readily applied to any mowing machine of conventional construction and whereby the cutting apparatus may be safely and accurately stationed at a predetermined elevation above the ground.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing, Figure 1 is a perspective view of a mowing machine equipped with the improved attachment. Fig. 2 is a transverse sectional view taken through the tongue of the machine and showing in elevation that part of the attachment which is applied to the tongue. Fig. 3 is an end elevation of the cutter bar showing the shoe and that part of the attachment which is applied thereto. Fig. 4 is a sectional detail view taken on the line 4—4 in Fig. 3.

Corresponding parts in the several figures are denoted by like characters of reference.

15, 16 are clip plates adapted to be positioned adjacent to the upper and lower faces of the tongue 17 of a mowing machine, said plates being apertured adjacent to the ends thereof for the passage of a bolt 18 and a rod 19, the latter having a hook 20 at the lower end thereof. The rod 19 is also threaded through the greater portion of its length for the reception of nuts 21, 22 bearing against the upper and lower faces of the clip plate 15, 16, respectively. The bolt 18 has a nut 23. It will be seen that by tightening the several nuts the clip plates 15, 16 may be securely tightened and fastened upon the tongue. It will, furthermore, be seen that by proper adjustment of the nuts 21, 22, the rod 19 having the hook 20 may be raised or lowered, the range of adjustment being limited only by the extent of the threaded portion of the rod. The hook 20 may thus be positioned at various distances below the tongue 17.

The shoe 24 at the outer end of the finger bar 25 carries a plate 26 on which a slide 27 is fitted for vertical movement, said slide carrying a ground wheel 28. Bolts 29 having nuts 30 may be employed for securing the slide at various adjustments, thereby enabling the outer end of the cutting apparatus to be supported by the ground engaging wheel 28 at various elevations above the ground.

It sometimes happens that it is desirable to cut material at an unusual distance above the ground. For instance, when weeds are getting a heavy start of grass and other crops, it is desirable to cut the tops of the weeds so as to check the growth thereof without cutting the grass or other crop. When such is the case the hook 20 may be adjusted to a proper position beneath the tongue, and the push bar 31 supporting the cutting apparatus may be supported in said hook, the slide carrying the wheel 28 being correspondingly adjusted to support the outer end of the cutting apparatus at a corresponding elevation above the ground. This adjusting and supporting device, it will be seen, is entirely separate from and independent of the lifting apparatus commonly employed, and such lifting apparatus is not interfered with by the application of the improved device.

It will be seen that I have produced a simple and effective means for supporting the cutting apparatus of any conventional mowing machine at a desired elevation, thus enabling the cutting apparatus to be sustained without requiring any effort on the part of the driver or operator.

Having thus described the invention, what is claimed as new, is:—

A mowing machine having a tongue, in combination with an attachment for said tongue, the same comprising two plates engaging, respectively, the top and bottom faces of the tongue, a bolt connecting said plates adjacent to one side of the tongue and having a nut, a screw threaded rod extending vertically through the plates adjacent to the other side of the tongue, and nuts on said screw threaded rod engaging the top and bottom faces of the upper and lower plates, respectively; the screw threaded rod having a hook at its lower end; the nuts on the threaded rod serving in connection with the nut and bolt to clamp the plates securely on the tongue and said nuts on the threaded rod serving also to secure the threaded rod at various vertical adjustments.

In testimony whereof I affix my signature in presence of two witnesses.

JOHN B. CHANDLER.

Witnesses:
N. P. SCOTT,
R. H. WALKER.

Copies of this patent may be obtained for five cents each, by addressing the "Commissioner of Patents. Washington, D. C."